Jan. 16, 1968    D. W. R. BROWN    3,364,306
SPLICE SIMULATOR FOR MOTION PICTURE FILM, TELEVISION
TAPE, AND THE LIKE, AND METHOD
Filed March 11, 1964    6 Sheets-Sheet 1

INVENTOR
DAVID W. R. BROWN
BY Mason, Mason & Albright
ATTORNEYS

INVENTOR
DAVID W. R. BROWN

BY Mason, Mason & Albright
ATTORNEYS

Jan. 16, 1968  D. W. R. BROWN  3,364,306
SPLICE SIMULATOR FOR MOTION PICTURE FILM, TELEVISION
TAPE, AND THE LIKE, AND METHOD
Filed March 11, 1964  6 Sheets-Sheet 4
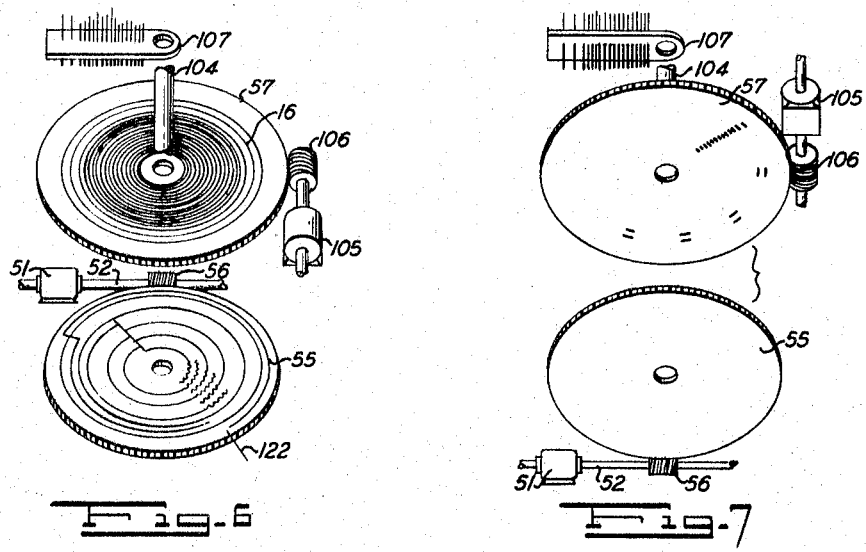
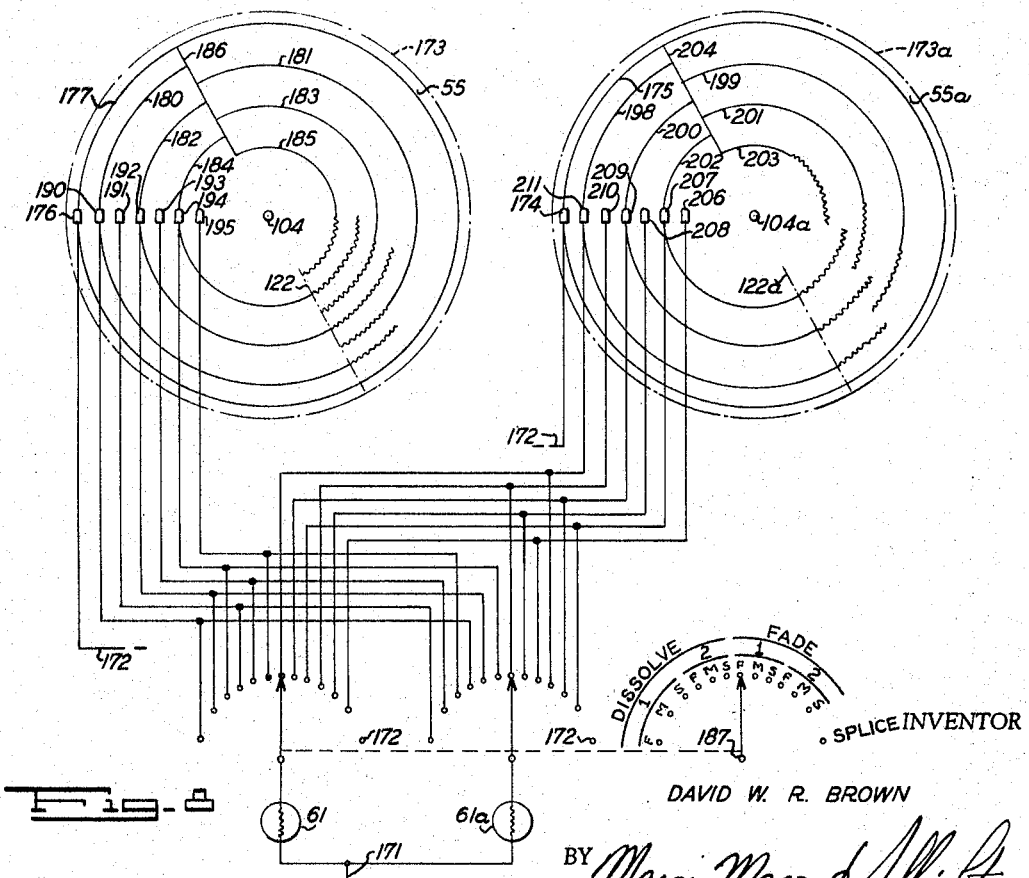
INVENTOR
DAVID W. R. BROWN

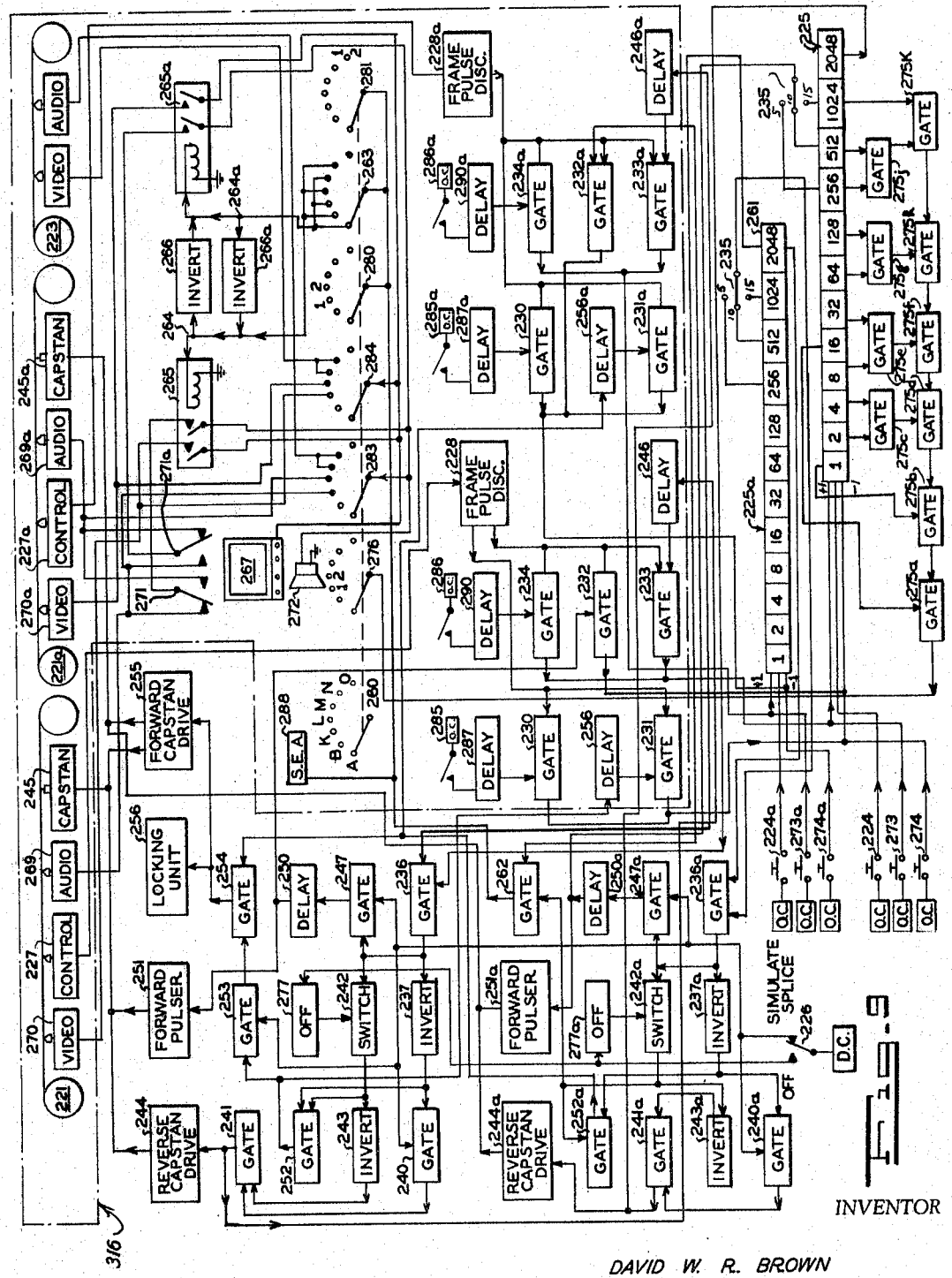

Jan. 16, 1968  D. W. R. BROWN  3,364,306
SPLICE SIMULATOR FOR MOTION PICTURE FILM, TELEVISION
TAPE, AND THE LIKE, AND METHOD
Filed March 11, 1964  6 Sheets-Sheet 6
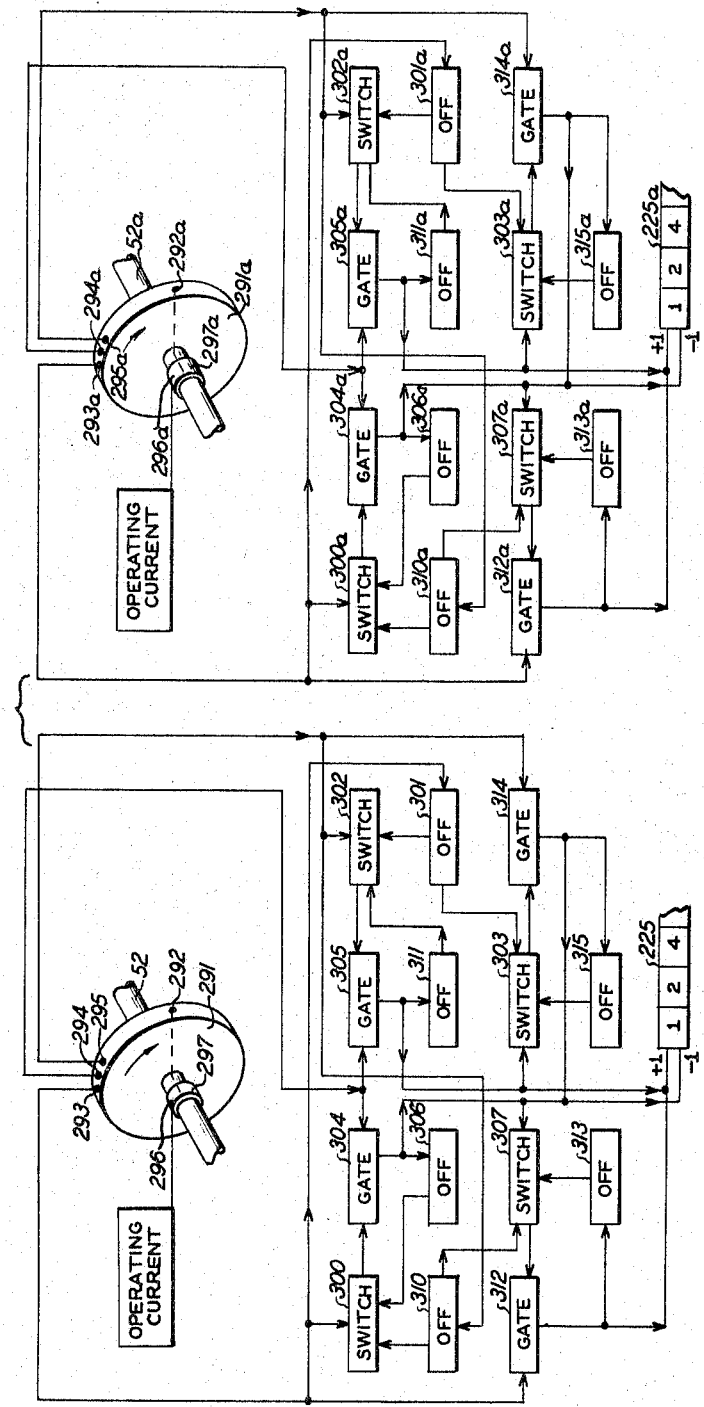
INVENTOR
DAVID W. R. BROWN
BY Mason, Mason & Albright
ATTORNEYS 3,364,306
SPLICE SIMULATOR FOR MOTION PICTURE FILM, TELEVISION TAPE, AND THE LIKE, AND METHOD
David W. R. Brown, 409 Marshall Court, Apt. E, Laurel, Md. 20810
Filed Mar. 11, 1964, Ser. No. 351,117
16 Claims. (Cl. 178—6)

ABSTRACT OF THE DISCLOSURE

Apparatus and method for simulating a motion picture film splice by first advancing and visually inspecting a first film strip whereby a place where it would appear desirable to splice the film is selected, then advancing and visually inspecting a second film strip whereby a place thereon where it would appear desirable to splice is selected, next backing up both of the film strips the same predetermined number of frames and advancing both strips of film together while projecting the first strip of film on a visual receiving means, automatically shifting the projection on the visual receiving means from the first to the second strip of film at the above-mentioned preselected places so that the desired splice is simulated on the visual receiving means.

Background and summary of the invention

This invention relates generally to film and television tape editing apparatus and, more particularly, to a device which optically or electronically simulates a splice of two pieces of motion picture film or television tape at preselected points.

The artistic editing involving the strips of motion picture film requires the illusion of a continuous flow of action at the point where the splice of the two films occurs. An experienced film editor can usually approximate within a few frames where the splice should occur. However, a selection of the exact frames of the two films between which the splice is to occur is usually determined by splicing the films together at a probable point. The spliced film is then viewed in motion and the sensitivity of the editor's eye determines whether the splice gives the illusion of continuous action. In the event that the splice does not produce the wanted illusion, then the two films are separated at the spliced point and another possible point for a splice is selected, spliced and again viewed. This process is repeated until the editor is satisfied with the splice. The process of selecting, splicing and viewing for each occasion is time-consuming and can result in the loss of a portion of the picture in the frame adjacent to the splice due to the nature of the splicing process.

Where magnetic tape is utilized as the recording medium for television signals, a frame-by-frame consideration for the purposes of splicing is precluded. The normal editing procedure is to record a cue word on the cue track carried by the tapes at the point where the same are to be spliced. Subsequently, such cue signals are located and the two tapes are cut and spliced together in the area of the cue words. With magnetic tape, the operation of erasing and recording up to the desired point may be substituted for the actual cutting and splicing operation. But, however accomplished, the results are viewed after the splice has been made and the same detriments are present as with film wherein the difference of even one frame can mean the difference between a good or poor splice.

In view of the foregoing, an object of the invention is to provide an optical simulation of a splice of two films before any actual splice of the film is made.

In a like manner, a further object of the invention is to provide a picture showing a simulated splice of television tape prior to making the actual splice.

Another object of the invention is to simulate a splice of the sound tracks which accompany the two pieces of film or television tape at the instant that the optical or electronic splice is simulated.

A still further object of the invention is to indicate to the operator the exact point on the films or television tape at which the actual splice is to be made.

The invention and other important advantages thereof will be better understood by referring to the following text, read in conjunction with the accompanying drawings in which:

Brief description of the drawings

FIGURE 6 shows in perspective the arrangement of the disc utilized in the machine shown in FIGURE 1;

FIGURE 7 shows in perspective the underside of the disc for the machine shown in FIGURE 1;

FIGURE 8 is a block schematic of the electrical connections for the dissolve and fade circuits of the invention;

FIGURE 9 is a block schematic of the electrical connections of the television tape splice simulator;

FIGURE 10 is a block schematic of the electrical components for utilizing the system shown in FIGURE 9 for motion picture film editing.

Description of the preferred embodiments

Figure 1:
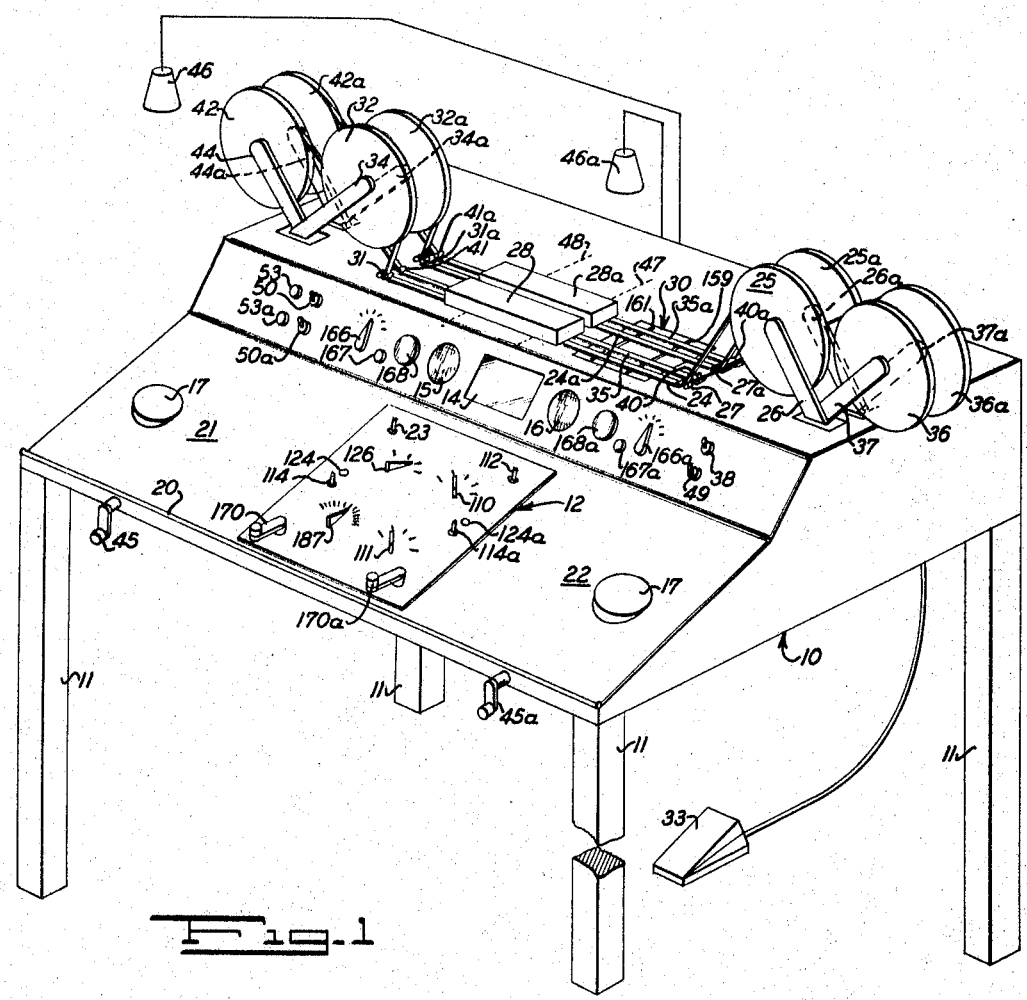
FIGURE 1 is a perspective view of the film editing machine embodying my invention.

Referring now to FIGURE 1, a metal console 10 supported by legs 11 carries a control panel 12 containing a plurality of switches having functions which will be explained subsequently. Above the control panel 12 is a translucent viewing screen 14, to the right and left of which are loud speakers 15 and 16. To the left of speaker 15 and to the right of speaker 16 are further switches, functions of which will be set forth hereinafter.

Utility shelves 17 are located in the front slope of the console on either side of the control panel 12 and a ledge 20 is provided to support scripts, papers or the like which may be placed in areas 21 and 22.

Since the two films to be viewed and any separate sound track films or tapes which accompany them follow similar paths, the letter "a" will be utilized with reference numeral with the second film and sound track medium to distinguish them from the same reference numerals applied to like elements of the first film and sound track medium.

Films 24 and 24a to be viewed are carried on reels 25 and 25a, respectively, which are affixed to spindles (not shown) on the arms 26 and 26a. Films 24 and 24a each first pass between a pair of rollers 27 and 27a, then over the film marking template 30, and, finally emerging from the optical and sound housings 28 and 28a, the films 24 and 24a pass out between a pair of rollers 31 and 31a to take-up reels 32 and 32a carried by spindles (not shown) located on arms 34 and 34a.

If sound tracks accompanying films 24 and 24a are on separate optical film or magnetic tape, such sound track media 35 and 35a are carried on reels 36 and 36a which are carried on spindles (not shown) extending from arms 37 and 37a. It will be noted from the drawings that the sound track media 35 and 35a pass from the reels 36 and 36a between the pairs of rollers 40 and 40a, over the marking template 30 to under the upper optical and sound housings 28 and 28a. From the housings, the sound track media 35 and 35a pass between the pairs of rollers 41 and 41a to their take-up reels 42 and 42a mounted on spindles (not shown) on arms 44 and 44a. Hand cranks 45 and 45a are provided so that the operator can advance the films frame by frame. A foot pedal 33 can be used to control the speed of the film.

Two script lights 46 and 46a which may be controlled from the console are mounted on the ceiling above the console 10 and cast rectangles of light on the surface areas 21 and 22.

In FIGURE 1, the dotted line 47 indicates the optical axis while the dotted line 48 indicates the sound axis. It should be noted that hand cranks 45 and 45a and 170 and 170a contain spring-loaded internal clutches so that they must be depressed slightly in order for them to engage their respective connective shafts.

Figure 2:
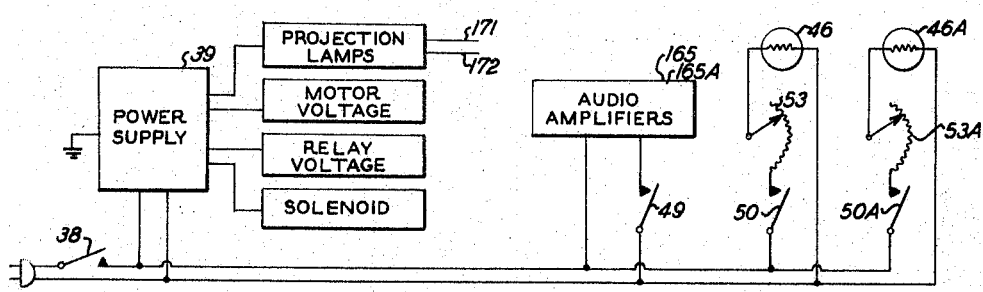
FIGURE 2 is a schematic diagram of the electrical distribution in the machine of FIGURE 1.

FIGURE 2 is a schematic diagram of the electrical distribution within the invention. A switch 38 controls the flow of electricity to the invention. A general power supply 39 provides proper operating voltages to various elements which will be discussed hereinafter. Electricity to the two audio amplifiers 165 and 165a is controlled by a switch 49. Script lights 46 and 46a are turned on and off by switches 50 and 50a whereas their brightness may be controlled by rheostats 53 and 53a. Motor voltage can be 12 volts, D.C., relay and lamp voltage 6 volts, D.C., and the solenoid voltage 50 volts, D.C.

Figure 3:
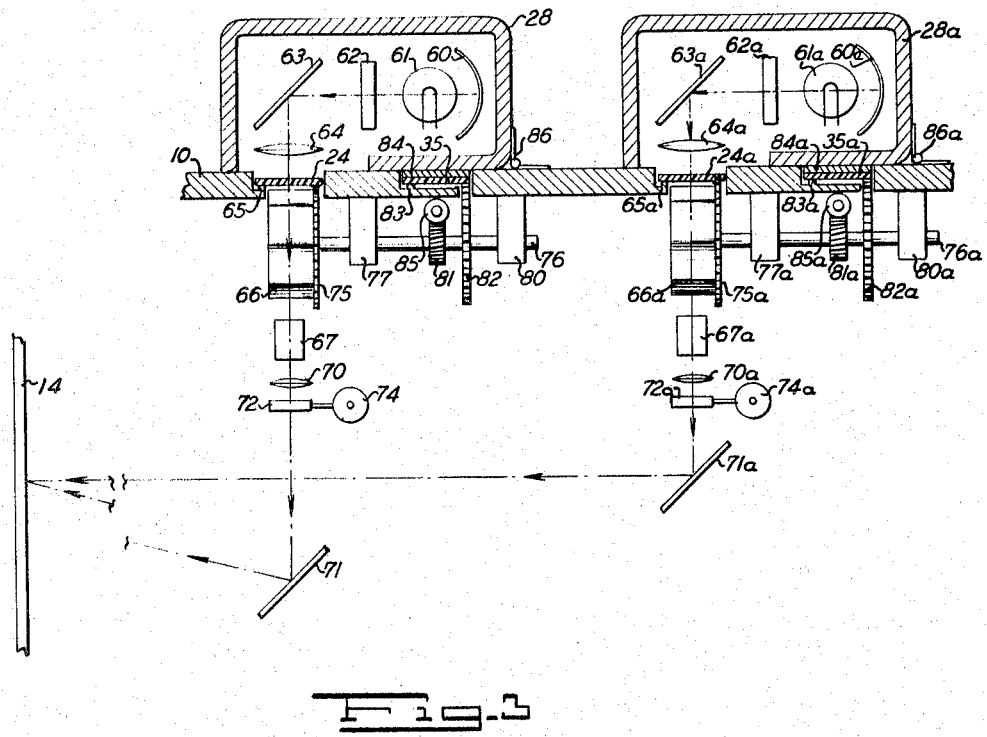
FIGURE 3 is a cross-sectional view of the optical axis of the machine of FIGURE 1.

Referring now to FIGURE 3, it will be seen that films 24, 24a pass under the upper optical and sound housings 28, 28a which contain reflectors 60, 60a, light sources 61 and 61a, heat filters 62 and 62a, mirrors 63 and 63a, and condenser lenses 64 and 64a. Light from sources 61 and 61a passes via filters 62 and 62a, mirrors 63 and 63a, and condenser lenses 64 and 64a through the films 24 and 24a, respectively. These films each rest in film guides 65 and 65a. Light passed through the films is received by rotating eight-sided prisms 66 and 66a which in this embodiment of the invention serve optically to hold the film frame moving above them on the viewing screen 14, thus producing the motion picture effect. Below the prisms 66 and 66a, the images pass through righting prisms 67 and 67a, objective lenses 70 and 70a to mirrors 71 and 71a, from whence they are reflected onto the translucent viewing screen 14.

Immediately below each objective lens 70 and 70a is a shutter. Each such shutter 72 and 72a is pivoted by its respective solenoid 74 and 74a.

The octagon prisms 66 and 66a are attached to film drive wheels 75 and 75a which have sprocket teeth around their perimeters to fit into sprocket holes and drive the films 24 and 24a in a familiar manner. The film drive wheels 75 and 75a are attached to shafts 76 and 76a, respectively, which are carried by supports 77 and 80 and 77a and 80a. To shafts 76 and 76a are also attached drive gears 81 and 81a and further sound media drive wheels 82 and 82a, respectively, with sprocket teeth around the perimeter of the latter wheels which engage and drive the sound track media 35 and 35a in the same direction and speed as the films 24 and 24a.

The sound track media 35 and 35a are carried in film guides 83 and 83a under pressure plates 84 and 84a. Drive gears 81 and 81a are driven by worm gears 85 and 85a.

The threading of films 24 and 24a and the sound track media 35 and 35a is accomplished by raising the upper optical and sound housings 28 and 28a which are hinged to the console 10 by hinges 86 and 86a.

Figure 4:
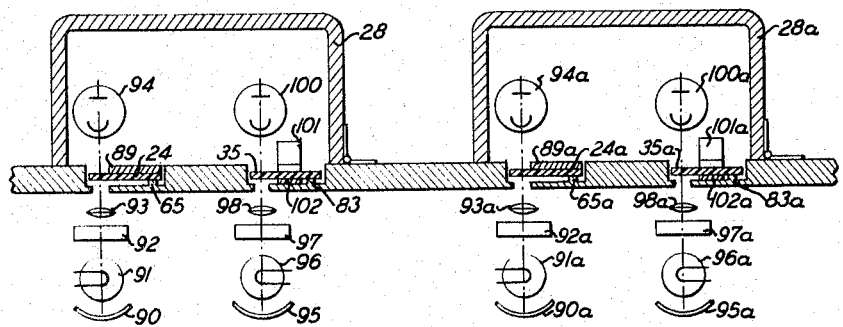
FIGURE 4 is a cross-sectional view of the sound axis of the machine of FIGURE 1.

Referring now to FIGURE 4, the films 24 and 24a rest in their film guides 65 and 65a under the pressure plates 89 and 89a. A system for reproducing an optical sound track on films 24 and 24a comprises reflectors 90 and 90a, light sources 91 and 91a, heat filters 92 and 92a, and condenser lenses 93 and 93a located under the films 24 and 24a, and photoelectric cells 94 and 94a located above films 24 and 24a within the housings 28 and 28a. Since the sound track media 35 and 35a may comprise either an optical or a magnetic sound track, provision is made for both kinds of pickup. Thus, there is also provided an optical system which includes reflectors 95 and 95a, light sources 96 and 96a, heat filters 97 and 97a, and condenser lenses 98 and 98a below the sound track media 35 and 35a which rest in their film guides 83 and 83a. Above the sound track media 35 and 35a are photoelectric cells 100 and 100a which are located in their respective housings 28 and 28a. Pickup of a magnetic sound track is accomplished through the magnetic pickup heads 101 and 101a against which the sound track media 35 and 35a are held by the respective pressure plates 102 and 102a.

Figure 5:
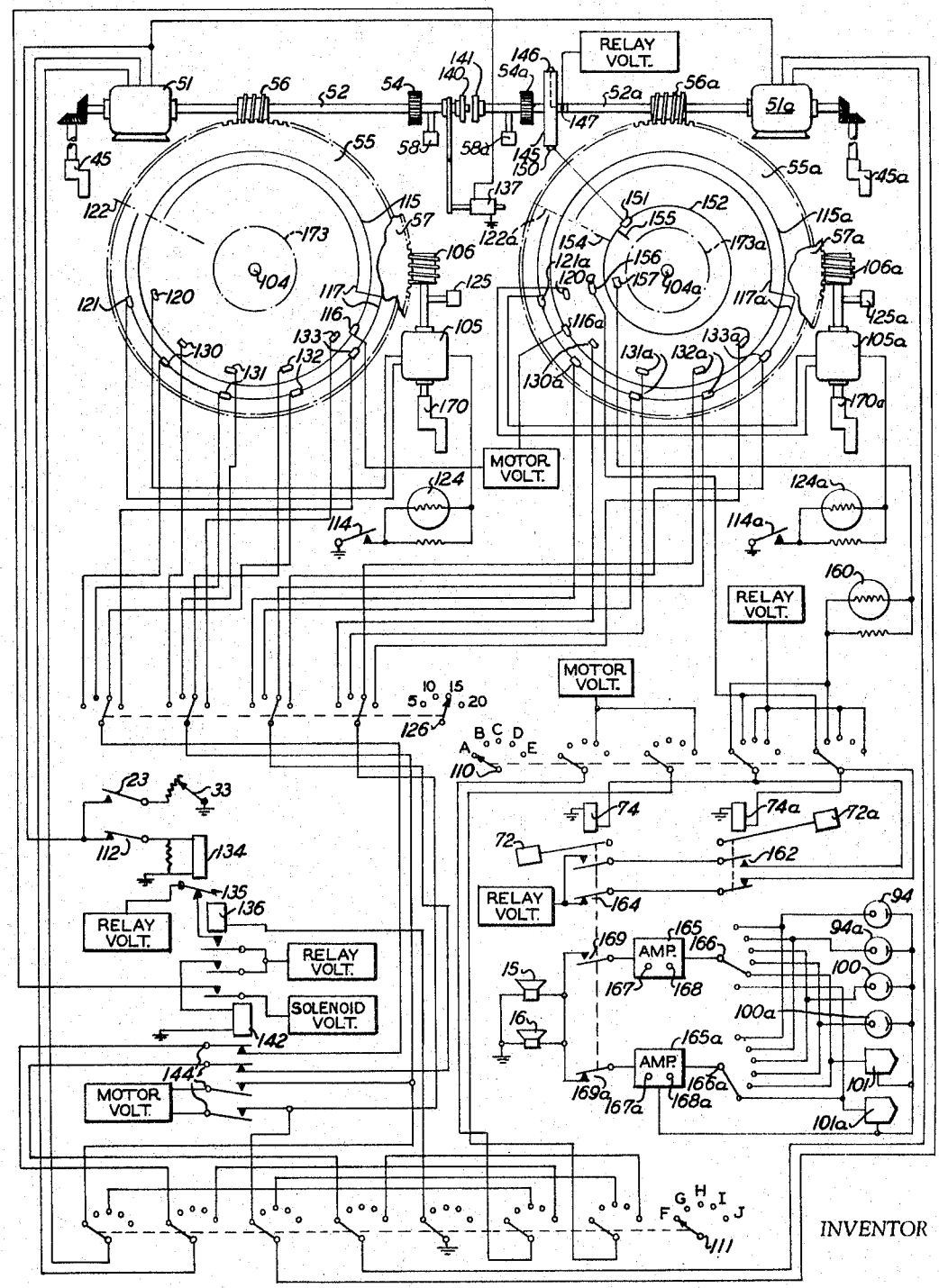
FIGURE 5 is a block schematic of the electrical connections for the invention shown in FIGURE 1.

The motive power for moving the films 24 and 24a via shafts 76, 76a is drive motors 51, 51a (see FIGURE 5). This is accomplished by drive shafts 52 and 52a from motors 51 and 51a, respectively, which carry gears 54 and 54a. A linkage, not shown but of any known type as would occur to those skilled in the art, is provided between gear 54 and gears 81 and 85 on shaft 76 and also between gear 54a and gears 81a and 85a on shaft 76a, whereby a complete revolution of the shaft 52 moves the film 24 one frame and in a like manner, a complete revolution of the shaft 52a moves the film 24a a single frame.

It will be understood that take-up belts (not shown) are provided between the spindles for the reels 25, 25a, 32, 32a, 36, 36a, 42 and 42a and the corresponding drive shafts 52 and 52a to maintain the films on such reels in the desired taut condition in a manner well known in the motion picture art.

Shafts 52 and 52a have keyed to them worm gears 56 and 56a which engage gear teeth around the perimeters of the discs 55 and 55a. In order to retain the shafts 52 and 52a in the same position when the motors 51 and 51a are not energized, weights 58 and 58a are provided, appropriately connected to their shafts 52 and 52a so that when the weights are in their downward position, a single frame of films 24 and 24a is projected through the eight-sided prisms 66 and 66a for projection on the screen 14.

Referring to FIGURE 6, there is a counter for each of the two films 24 and 24a. The counters essentially comprise two pairs of rotatable discs—the aforementioned lower discs 55 and 55a and upper discs 57 and 57a. All of the discs are provided with gear teeth around their periphery. The discs 55 and 57 are rotatable about shaft 104 and the discs 55a and 57a are in a like manner rotatable about the shaft 104a, the shafts 104 and 104a being suitably affixed within the console 10.

The upper discs 57 and 57a are driven by direct current motors 105 and 105a through worm gears 106 and 106a which engage the gear teeth around the peripheries of the upper discs 57 and 57a. The lower discs 55 and 55a and the upper discs 57 and 57a have printed circuitry on their upper surfaces, the same being in concentric circles on 57, 57a. Each such circle contacts a brush on brush carriers 107 and 107a (not shown) which are disposed above the discs 57 and 57a. Accordingly, it will be appreciated that there is an electrical connection between each brush on the brush carriers 107 and 107a and a corresponding circular circuit on the top of the discs 57 and 57a. Each of the circular circuits on the top of the discs 57 and 57a also have an electrical connection with a further brush which protrudes from the underside of the discs 57 and 57a, as shown in FIGURE 7. These latter brushes in turn make electrical selective contact with the printed circuitry on the top of the discs 55 and 55a.

Referring back to FIGURE 5, the multiple throw switch 110 controls, among other things, the feeding of an electrical voltage to the motors 51 and 51a when in a position designated D (view or rewind film 1) or E (view or rewind film 2) and when switch 111 is in a position designated H (view) or J (rewind).

Assuming that the operator desires to view the film 24 for the first scene and the film 24a for the second scene, switch 110 is first placed in the D (view or rewind film 1) position and the multiple throw switch 111 is placed in the H (view) position. Voltage is then led ot the motor 51 whereby the film 24 is caused to run forward by the linkage heretofore described. It will be understood that because of the position of switch 110, relay voltage will be conveyed to relay 74 whereby the shutter 72 is held away from the light path conveying the image from film 24 to screen 14 while the shutter 72a blocks off an image to the screen 14 from the film 24a. When the operator comes to approximately that point at which he desires to start the next scene, he turns the switch 111 to I (stop), and may either rewind as desired by placing switch 111 on J (rewind) or open the switch 112 and crank by hand through means of crank 45 to the particular frame he desires to be the last frame in scene one, following which switch 112 is closed. When this is accomplished, the operator turns switch 110 to the E (view or rewind film 2) position and repeats the operation with film 2, the electric current now being led to the motor 51a and the shutter 72 being shut with the shutter 72a opened to admit an image from the film 24a to the viewing screen 14. This time, of course, the operator determines that frame which he desires to be the first frame of the second scene.

It will be appreciated that at this point wherein the first and last film of the scene have been provisionally selected, the normal procedure would be to splice the film together and to try it out to determine the visual effect. However, it is the object of this invention now to simulate the splice without recourse to actual splicing. This is accomplished by first closing switches 114 and 114a. When these switches are closed, it will be noted that motor voltage current supplied to the circular contacts 115 and 115a through brushes 116 and 116a which extend downwardly through the respective upper discs 57 and 57a is permitted to flow through the circuits 117 and 117a through either brush 120 or 121 to motor 105, or through 120a or 121a to motor 105a, depending upon the position of the lower discs 55 and 55a with respect to the upper discs 57 and 57a.

Since the motors 105 and 105a rotate the upper discs 57 and 57a, it will be understood that the flow of electricity from brushes 120 and 120a causes the discs 57 and 57a to rotate in a counterclockwise direction whereas electricity flowing through the brushes 121 and 121a causes the upper discs 57 and 57a to rotate in a clockwise direction. When the brushes 120 and 121 reach a position along a radial line marked 122 with respect to the lower disc 55 the current to the motor 105 is reversed and, accordingly, the brushes 120 and 121 will tend to home in exactly over the position 122 on disc 55. The same occurs with respect to brushes 120a and 121a for the position on radial line 122a of the disc 55a. When this occurs with each of the discs, the control lights 124 and 124a will go out since no further current will be passing through the motors 105 and 105a. It will be noted that weights 125 and 125a are affixed to the shafts carrying the worm gears 106 and 106a in the same manner as weights 58 and 58a were affixed to the shafts 52 and 52a. In this respect it will be understood that the relationship between the worm gears 106 and 106a and the upper discs 57 and 57a are the same as between the worm gears 56 and 56a and the lower discs 55 and 55a. Accordingly, the weights 125 and 125a are so arranged that they will be in a downward position when the brushes 120 and 121 home over the position 122 and when the brushes 120a and 121a home over the position 122a. When both lights 124 and 124a are out, switches 114 and 114a are opened. Switch 126 is then placed to the selected number of seconds for which it is desired the film to run before the simulated splice takes place, switch 111 is set to F (simulate splice) and switch 110 is set to the position to indicate whether film 24 (#1) or film 24a (#2) is to form the first part of the splice, that is, either A (film 1, first scene) or B (film 2, first scene). Current is then fed to the circular contacts 115 and 115a to conduct current through brushes 130, 131, 132, 133, and 130a, 131a, 132a, or 133a, depending upon the number of seconds chosen on switch 126, whereby the motors 51 and 51a rotate the lower discs 55 and 55a counterclockwise so as to bring the positions 122 and 122a under the particular brushes selected. In this respect, it will be understood that the brushes 130, 131, 132, and 133 extend from the underside of the upper disc 57 and, in a like manner, the brushes 130a, 131a, 132a, and 133a extend from the underside of the disc 57a. If the motors 51 and 51a cause the selected brushes to overshoot the positions 122 and 122a, it is to be appreciated that the motors reverse the discs and cause the brushes to home in over the positions in the same manner as previously described with reference to motors 105 and 105a.

When both of the motors 51 and 51a have homed the positions 122 and 122a in under the desired brushes, electricity will cease flowing in the ground circuit from the motors 51 and 51a to a relay 134. Relay voltage will then be entered into a circuit at point 135. Relay 136 operates to introduce solenoid voltage current to a solenoid 137 which in turn moves a clutch member 140 into contact with its opposing face 141 to join the shafts 52 and 52a together for the splice simulation run. The relay 136 also introduces relay voltage current to the relay 142 to operate a four-blade, two-way switch 144 which cuts off the supply of reverse current to motors 51 and 51a through the switch 126 and starts the now interlocked motors to run forward through the connections made by switch 144. The relay 136 is normally a delayed action relay to insure that the weights 58 and 58a have come to rest before the interlocking of the shafts 52 and 52a occurs.

A frame pulse wheel 145 is affixed to the shaft 52a. On the perimeter of the wheel 145 is a contact 146 which is supplied a positive electrical current through a brush 147, the positive current being supplied from any suitable source such as a relay voltage current source. As the wheel 145 rotates, the contact 146 comes into contact with a brush 150, thus sending out a positive pulse for each revolution of the wheel 145 and since, in this embodiment, each revolution of the shaft 52a causes the passage of one frame of film through the film gates, each pulse represents one frame of film. The wheel 145 with contact 146 is so located on the shaft 52a that a pulse will be generated at that moment that one frame of film is being shifted to the subsequent frame. In other words, the pulse is sent between the projection of each frame of film.

The frame pulses are conducted through brush 151 located on the underside of the disc 57a to a commuter ring circuit 152 printed on the lower disc 55a. Extending outwardly from the circuit 152 coincident with the radial position 122a is a short spur circuit 154. An inwardly extending spur circuit 155 is located clockwise a distance equivalent to the running of 18 frames of film from the circuit 154 and is connected to the circuit 152. Frame pulses from the circuit 154 are picked up by a brush 156 extending from the underside of the upper disc 57a when the circuit 154 is directly beneath it. In a like manner, pulses from the circuit 155 are picked up by a brush 157 also extending from the underside of the disc 57a when the circuit 155 is directly under the brush 157. A light 160 is connected to the circuit which leads from the brush 157. The light 160 is located directly under a slit 161 in the console 10 under the marking template 30

(see FIG. 1). The slit 161 is disposed eighteen frames to the right of the optical center of the gates, and thus is positioned so that the film will be marked as will be explained later at the point where the actual splice is to be made.

It will be noted that the frame pulses from the wheel 145 are conducted from brushes 156 and 157 to the switch 110 and from there are relayed to the solenoids 74 and 74a to control the opening and closing of the shutters 72 and 72a.

As the film was backed up for the simulation run and the discs were rotated counterclockwise, the circuit 154 passed under the brush 156 and the frame pulse occurring at that time energized the solenoid 74a which pulled the shutter arm for shutter 72a away from the optical axis of film No. 2. At the same time the contact 162 was broken, thus terminating relay voltage current to the solenoid 74 whereby the shutter arm for shutter 72 moved shutter 72 into the optical axis of film No. 1. However, as the disc 55a continued to rotate in preparation for the simulation run in a counterclockwise direction, the circuit 155 came under the brush 157 and the frame pulse occurring at that time energized the solenoid 74 which pulled the shutter arm for the shutter 72 away from the optical axis of the film No. 1, thereby allowing images from such film to be projected on screen 14. At the same time, the contact 164 was broken, whereby relay voltage current was no longer supplied to the solenoid at 74a, and whereby the shutter 72a returned to its previous position and intercepted the image projection from film No. 2. It will be understood that this is the position that the shutters 72 and 72a are in when the splice simulation phase begins.

With the motors 51 and 51a, which are interlocked through the clutch faces 140 and 141, running forward and the discs 55 and 55a running in a clockwise position, the films and the discs having previously been backed up for the splice simulation run, the circuit 155 comes underneath the brush 157 to energize solenoid 74 which was the last solenoid energized so no change in the shutter 72 occurs. However, when the position 122a together with the circuit 154 passes under the brush 156, a frame pulse is conveyed to the solenoid 74a. When this occurs, in a manner previously described the shutter 72a is removed from the optical axis of the film No. 2 and simultaneously the shutter 72 intercepts the optical axis of the film No. 1 so that the projection of film No. 2 is now projected on the viewing screen 14 whereas that from film No. 1 is thus cut off, thus completing the splice simulation.

The solenoid 74 also actuates switches 169 and 169a whereby the loudspeakers 15 and 16 may have their signal source shifted, at the same time the simulated splice occurs, from the sound track medium accompanying the first film to the sound track medium accompanying the second film. Also, it will be noted that two switches 166 and 166a allow for the selective connection of any one of the audio pickup elements, i.e., photoelectric cells 94, 94a, 100, 100a, magnetic pickup heads 101 or 101a to either of the two amplifiers 165 and 165a. Each amplifier 165 and 165a has tone controls 167 and 167a and volume controls 168 and 168a. It will be understood from FIGURE 5 that when the simulated splice of the first film to the second film occurs, there will also occur a simulated splice of the sound track media provided the switches 166 and 166a have previously been set for the sound track media involved, and that the amplifiers 165 and 165a are in operation and set at the proper volume and tone control.

If, after viewing the simulated splice, the operator believes that either film might need the addition or deletion of a frame adjacent to the splice point, he enters this into the counter concerned by turning the appropriate hand crank 170 or 170a for the respective motors 105 and 105a. A full turn counterclockwise of crank 170 adds a frame to the first film of the scene whereas a full turn clockwise of crank 170a will also move the second film a frame forward for the simulated splice. By cranking the other way, the reverse takes place. After this is accomplished, the film is backed up and run through the simulated splice as explained above. The process of adjusting and viewing continues until the operator is satisfied with the splice location. At that time, in order to mark the film for actual splicing, the operator sets the switch 126 for a five second run time and switch 111 to "F" (simulate splice). However, as soon as the films have locked together and start to move forward, he opens the switch 112, thus cutting off the current flow through the motors 51 and 51a and cranks the film by hand crank 45 or 45a, or both, until the marking light 160 is turned on, at which time the exact frame lines on which the splice is to occur will be over the marking light slit 161. If desired, the sound media can be marked for splice by moving the film splice mark over line 159 (26 frames to the right on 16 mm. film) which places the splice point for the sound media over slit 161.

The operator can then mark the film with a grease pencil for later splicing or he can cut the film and make the splice at that moment if he so desires. Having either marked the film for splicing or having spliced the film together, the operator moves on to the next two scenes to be edited and repeats the process, examining each scene, setting the counters, viewing and adjusting the splice simulation until he is satisfied, and then marking or splicing the film.

Instead of the splice, it is frequently desirable from the artistic point of view to fade one scene into another or to fade one scene completely out and then fade the subsequent scene back to normal brightness. The diagram set forth on FIGURE 8 shows how a simulation of this may be accomplished. It will be understood that the circuitry shown in FIGURE 8 is set forth separately for clarity, but that the upper portion of discs 55 and 55a is the same as shown in FIGURE 5, except that in FIGURE 5 the fade-in, fade-out circuitry has not been shown since it is felt that it would tend to overcomplicate that figure. Broken lines 173 and 173a on FIGURES 5 and 8 indicate the relationship of the two drawings to each other.

A positive source of electricity is fed to the lights 61 and 61a from the circuit 171. A negative source of electricity is introduced from circuit 172 through the brush 174 extending through the lower part of the disc 57a and contacting the ring circuit 175. In a similar manner, the negative circuit connects with a brush 176 which extends through the lower portion of the disc 57 and makes contact with a ring circuit 177 on the upper side of disc 55. When the switch 110 is in position "C" (dissolve or fade), both solenoids 74 and 74a are energized and both shutters 72 and 72a are removed from the optical axis of the lights 61 and 61a.

On the upper side of the disc 55 there are located six circuits, 180, 181, 182, 183, 184, and 185, which effect the simulation of a dissolve of the picture on one film into that of the other film. Each of the six circuits consists of a length of normally conductive wire affixed to the upper side of disc 55 indicated by the smooth line and a length of high resistance wire wound on an insulated core of the same diameter as the normally conductive wire indicated by the zigzag line. Current is supplied to these six circuits through a cross circuit 186 which connects to the ring circuit 177. Brushes 190, 191, 192, 193, 194, and 195, each contact the corresponding one of the six aforenamed circuits and conduct current flowing from such circuits to the switch 187 and thence to lights 61 and 61a. The high resistance circuit varies in its resistance whereby an even and constant dimming or brightening of lights 61 and 61a is produced.

On disc 55a there are located six somewhat similar circuits, 198, 199, 200, 201, 202, and 203, which effect the simulation of a fade-out-fade-in wherein one picture fades to a black and the other picture then fades from black to its normal brightness. These circuits receive their current from a crossover circuit 204 which connects to the negative electrical circle source ring 175. It will be appreciated that these six circuits also consist of a normally conductive portion indicated by a straight line and a highly resistant portion indicated by a zigzag line, the latter having a variable resistance to give a smooth fade-in, fade-out effect. The brushes 206, 207, 208, 209, 210, and 211, extend from the underside of the disc 57a and contact the various circuits on the upper portion of disc 55a, as shown, to conduct current to the switch 187.

The brushes 190, 191, 192, 193, 194, and 195 are in a radial alignment with brushes 120 and 121. By the same token, the brushes 206, 207, 208, 209, 210, and 211 are in radial alignment with the brushes 120a and 121a.

As was previously shown, the films 24 and 24a may be aligned for the simulated phase wherein the discs 55 and 55a rotate at the same speed and direction and the radial locations 122 and 122a pass under the aligned brushes at the same instant. The speed at which the dissolve or fade is effected is determined by the length and winding of the resistance wire placed in the particular circuit.

It will be noted that the switch 187 provides for selection of a splice, dissolve or fade, the speed at which the dissolve or fade will progress (slow, medium or fast), and which film is to form the first part of the effect. In the drawing, switch 187 is set to simulate a fast fade-out-fade-in with film No. 1 forming the first part of the effect so that film No. 1 will fade out to black and then film No. 2 will fade in from black to normal brightness.

In operation, at the start of the simulation phase, the locations 122 and 122a are counterclockwise from the aligned brushes at a distance of approximately one-eighth to one-half of a revolution, depending upon the amount of lead time the operator has set the switch 126 for the film to run before the simulation takes place. In the example, brush 211 would thus be contacting the normally conductive portion of circuit 198 and, accordingly, conducts full current through the switch 187 to light the bulb 61 and thus project film No. 1 on the viewing screen 14. As the two films 24 and 24a move through the invention together, the discs 55 and 55a rotate in a clockwise direction and as the location 122a comes under the brush 211, said brush contacts the high resistant portion of the circuit 198. As the disc 55a continues to rotate clockwise, the light 61 fades out and when the brush 210 starts to contact the high resistant portion of the circuit 199 and convey current through the switch 187 to the light 61a for film No. 2, the light 61a becomes brighter as the brush 210 gets closer to the normally conductive part of the circuit 199. Once the brush 210 reaches the normally conductive portion of the circuit 199, the light 61a is at its maximum brightness and the fade-out-fade-in simulation is completed.

When a straight splice of the two films is to be simulated, switch 187 is turned to its extreme right position as shown in the drawing, in which position the maximum current flows through both of the lights 61 and 61a.

From an inspection of FIGURE 8, it is to be seen that a fade-in, fade-out or dissolve simulation can be accomplished at the various speeds indicated. Thus the operator can try various combinations until he has the one which suits him best. Also, as explained before, if he is not satisfied with where the film begins to dissolve or fade back in any case, this can be easily adjusted by turning the cranks 170 or 170a to add or subtract frames as desired.

FIGURE 9 illustrates a solid state circuitry and other elements of the embodiment of my invention as applied to television tape recorders. The design of the solid state components, consisting of gates, inverters, switches and delays, are well known to the art and are therefore shown symbolically to clarify the drawing. In this connection it will be understood that the gates are "and gates."

Two standard tape recorders (not shown) have threaded on them two magnetic film strips comprising tapes 221 and 221a for which a splice is to be simulated. After the splice point is chosen (by means to be subsequently described) the video signals with the proper splice may be transferred to a third recorder (not shown) onto tape 223. Or, if a series of splices is desired to form a composite tape, the complete scenes may be strung out on either tape 221 or 221a and as the invention is operated the other tape 221a or 221, as the case may be, becomes the properly spliced composite tape.

The tape to form the first part of the splice (for example, tape 221) is viewed using conventional viewing controls to be found on known recorders, and at the possible splice point, the switch 224 is momentarily depressed causing binary counter 225 to be reset to 0. In a similar manner, tape 221a is viewed and switch 224a is momentarily depressed at a possible splice point, which causes binary counter 225a to be reset to 0. With this, the operator is now ready to simulate a splice.

Recorded parallel to the edge of television tape is a control track which contains a signal for each picture frame (as well as other control signals). These frame pulses are picked up by heads 227 and 227a, pass through frame pulse discriminators 228 and 228a which reject the other unwanted control signals, and onto a series of gates 230, 230a, 231, 231a, 232, 232a, 233, 233a, 234 and 234a. These gates are operated by various elements of this invention, as will be explained, and cause the frame pulses to be directed to either the "add one" or "subtract one" sides of the binary counters 225 and 225a depending on the direction in which the tapes 221 and 221a are moving. If the particular tape is moving in a reverse direction, the frame pulses are added into the binary counter. If the tape is moving in a forward direction, each frame pulse subtracts a bit from the binary counter involved.

The operator having set the binary counters to 0 at the possible splice points and having turned switch 235 (shown in two parts, these two parts being separate gangs of the same switch) to the desired run time before the simulated splice occurs (in the drawing, 10 seconds), he now turns switch 226 from its normally "off" position to "simulate splice." At this time, gates 236 and 236a do not pass current since the binary counters must be between 512 and 1023 or 1636 and 2047 before such gates will operate and presently the counters are near 0. Therefore, no current is fed to inverters 237 and 237a which circumstance causes current to be fed to gates 240 and 240a. The presence of this current plus that from switch 226 causes gates 240 and 240a to pass the current onto gates 241 and 241a. Since gates 236 and 236a have not yet operated, latching switches 242 and 242a are off which causes inverters 243 and 243a to pass current to gates 241 and 241a. This current from inverters 243 and 243a and that from gates 240 and 240a causes gates 241 and 241a to pass current, and, in turn, actuates reverse capstan drive power, designated 244 and 244a, to the capstan drive motors 245 and 245a, thus causing the respective tapes 221 and 221a which are driven thereby to back up. As said tapes back up, frame pulses from their respective tapes pass to gates 233 and 233a which, with the current from gates 241 and 241a, cause the frame pulses to pass and be added into the binary counters 225 and 225a.

When the tapes have each backed up 512 frames from the possible splice point, the binary counters will be at 512 which causes gates 236 and 236a to pass current. Inverters 237 and 237a then cause gates 240 and 240a, and 241 and 241a to turn off which stops the reverse capstan drive power to the capstan drive motors 245 and 245a. Off-delays 246 and 246a of about 0.5 second allow frame pulses to continue to the "add one" sides of the respective binary counters while their respective tapes slow to a stop.

The current from the operation of gates 236 and 236a in combination with that from switch 226 causes gates 247 and 247a to pass current to delays 250 and 250a where it is delayed for one second then onto the forward pulsers 251 and 251a which causes a pulsing forward drive signal to be sent to the capstan drive motors and the tapes to be moved forward a fraction of an inch several times per second.

The operation of gates 236 and 236a also causes latching switches 242 and 242a to turn on.

A current from the one second delays 250 and 250a in conjunction with the frame pulses causes gates 232 and 232a to pass the pulses to the "subtract one" side of the binary counters 225 and 225a as the tapes pulse forward from where they finally stopped (roughly around frame 520). The instant that the binary counters register frame 511, gates 236 and 236a turn off which, in turn, turn off gates 247 and 247a, delays 250 and 250a, and the forward pulsers 251 and 251a, thus causing the respective tapes 221 and 221a to stop pulsing forward.

The turning off of gates 236 and 236a causes inverters 237 and 237a to pass current to gates 252 and 252a which in conjunction with the current from the latching switches 242 and 242a cause gates 252 and 252a to convey current onto gate 253 and gate 254, respectively. Gate 253 with current from switch 226 then passes a current to a gate 254 which operates in conjunction with current supplied by gate 252a to cause forward capstan motor drive power, designated 255, to cause capstan motors 245 and 245a to move the tapes in a forward direction. Also, the operation of gate 254 activates a locking unit 256 comprising television signal synchronizer (of which there are several commercial models currently available) which locks the two tapes together in synchronization. It is to be understood that gate 254 operates only after both tapes have backed up, stopped, pulsed forward to frame 511, stopped, and are ready to be locked together and run forward to simulate a splice.

Currents from gates 252 and 252a also pass to gates 231 and 231a through off-delays 256 and 256a (which have a turn-off delay of about 0.5 second) thus causing each frame pulse detected to subtract one from the binary counter as the tape moves forward in the splice simulation phase.

A switching system designated generally 260 controls the display and possible ultimate recording of the splice simulation of both the television and audio. As the two tapes 221 and 221a move forward in the splice simulation run, the binary counters count down together, and on reaching 0, the next frame pulse causes all stages to invert to an "on" condition. This characteristic of binary counters is taken advantage of by having this described inversion to trigger the splice simulation. Specifically, a stage 261 of the binary counter 225a when turned on (which is at the instant that the splice simulation is to occur) passes a current to gate 262 which turns on in conjunction with the current from the latching switch 242a. Thus, current flowing from gate 262 is an indication that the television signals representing the second part of the scene should now be displayed or recorded and that the audio to accompany the second part of the scene should now be heard or recorded. A switch 260 controls the display and recording functions. The letters on switch 260 designate the following: A—View #1, first scene; B—View #2, first scene; K—Record #2 after #1; L—Record #1 after #2; M—#1 first scene on #3; N—#2 first scene on #3; and O—Record mark signal on cue track.

For example, in the drawing, switch 260 is set at "A" (for view #1, first scene). As the tapes begin their splice simulation run, gate 262 is conducting no current and switch 263 is connected to point 264a, therefore no current flows to operate relay 265a. However, inverter 266a does cause current to flow and operate relay 265 which causes the television signal from tape 221 and television head 270 to be conveyed to a television screen 267. As the tapes move forward, scene one continues to be displayed on the television screen 267 until the instant at which binary counter 225a inverts after registering 0. As previously described, gate 262 then starts to conduct current which, through inverter 266a, turns off relay 265 and now turns on relay 265a which immediately conducts the television signal from tape 221a picked up by television head 270a to the television screen 267, thus completing the visual simulation of the splice. The selection of the audio to the splice is made through two switches 271 and 271a whose inputs are audio pickup heads 269 and 269a and whose outputs pass, respectively, through relays 265 and 265a, to loudspeaker 272. The splice operation of the audio signal is similar to that of the television. As shown on the drawing, if the audio from tape #1 is to be used for the first part of the splice and that of tape #2 for the second part of the splice, as the tapes begin their splice simulation run, the audio portion of tape #1 passes through relay 265 (previously described as on) to the loudspeaker. On reaching the splice point, relay 265 turns off and relay 265a comes on thereby allowing the audio signal from tape #2 to pass onto the loudspeaker 272 thus consummating the audio splice.

If, after viewing a splice, the operator wishes to add or delete frames adjacent to the splice point, he does this (after turning switch 226 off) by momentarily pressing, once for each frame, switches 273, 273a, 274 or 274a which add or subtract one from the binary counters 225 and 225a. Switches 273 and 273a each subtract a frame from the first scene or add a frame to the second scene for their respective tapes, depending upon whether the tape concerned is the first or second scene. Switches 274 and 274a accomplish the opposite result.

Because of the close recording tolerances of television tape, it is necessary that one record on tape which is free of other television signals, that is, erased tape. If it is desired to record on a tape with existing television information (for example, if one is to splice electronically a scene from tape #1 onto a scene on tape #2), it is necessary to provide erased tape at the television heads of tape #2 at the instant that the splice is to be made. Since the master erase head is several inches (approximately 18 frames) ahead of the television record head on recorders in general contemporary use, it is necessary that the invention anticipate the splice by 18 frames so that the master erase head can be started thus clearing tape from a point which will arrive at the record heads at the instant that the new television signal is to be recorded on the tape.

Provision for this anticipation of the splice is made in my invention by a number of gates 275a, 275b, 275c, 275d, 275e, 275f, 275g, 275h, 275j, and 275k which are connected to binary counter 225 and which, it will be readily appreciated, cooperate with each other to cause gate 275a to pass a current when the counter 225 has reduced to 17, which is 18 frames ahead of the splice since the splice does not occur until the counter inversion after the counter reaches 0. This current is led to a gang, designated 276, of switch 260 where it is directed to the proper recorder to activate the master erase head.

When the operator wishes to stop the machines after a splice simulation, he turns switch 226 to "off" which turns off gate 254 thus stopping and unlocking the two recorders. Also, the turning off of switch 226 causes currents to flow to reset elements 277 and 277a which in turn unlatch (turn off) latching switches 242 and 242a. If the operator desires a dissolve, fade, or other effect between the two scenes, a commercially available special effects amplifier 288 which has suitable input and output switches for combining two scenes into a third is provided. It is actuated by the current which flows from gate 262 at the instant of the aforementioned counter inversion.

Another gang, designated 280, of switch 260 passes the current which starts flowing from gate 262 at the instant of the splice to the proper machine during the splicing run to switch it over to the record mode. It is assumed that if the operator were recording onto a third machine, he would put the machine into the record mode by using the appropriate switch on such machine.

A further gang, designated 281, of switch 263 puts a signal on the cue track of the two tapes involved so that, where desired, the tapes can later be actually cut and spliced.

Still another gang, designated 283, of switch 260 directs the audio to the proper recorder. And lastly, a designated gang 284 of switch 260 directs the video signal to the proper machine for recording.

Switches 285 and 285a and 286 and 286a are intended as representative tape movement switches in conventional recorders. Should the operator wish to review a tape after the possible splice point has been selected, he would use the switches on the existing machine. However, the frame-by-frame movement of the tape would be kept account of so that when he did desire a splice simulation, my invention would go through the simulation with reference to his original possible splice points.

Off-delays 287 and 287a and 290 and 290a of 0.5 second are provided following the aforementioned switches so that the respective binary counters 225 and 225a can continue counting (as previously described) until the tapes come to rest after the aforementioned switches have been turned off.

Operating current for the various independent switches is from a general power supply (not shown) and is designated by the initials "O.C." in a box.

FIGURE 10 shows a modification of a portion of the circuitry of FIGURE 9 comprising generally gates 230, 230a, 231, 231a, 232, 232a, 233, 233a, 234, and 234a, switches 285, 285a, 286 and 286a, delays 246, 246a, 256, 256a, 287, 287a, 290 and 290a, and frame pulse discriminators 228 and 228a. In this embodiment of my invention, electronic counters similar in design and function to those in FIGURE 9 are used in place of mechanical counters, as in the previously explained embodiment of FIGURES 1 through 8 comprising generally rotatable discs 55, 55a, 57, 57a, printed circuits, brushes, and other associated elements.

Except as otherwise stated, no connection exists between the circuitry outside the line designated 316 in FIGURE 9 and that of FIGURE 10 other than through the counters 225 and 225a. Circuitry inside the line 316 is eliminated insofar as that shown in FIGURE 10 is concerned.

The primary purpose of the circuitry of FIGURE 10 is to direct frame pulses to the proper inputs (either plus one or minus one) of the binary counters 225 and 225a (depending on the directions that the films are traveling) which in turn activate various elements of my invention to cause for one thing a simulation of a splice of two motion picture films.

Specifically, frame pulse wheels 291 and 291a are attached to shafts 52 and 52a. It will be recalled from the previous discussion that one rotation of shafts 52 and 52a represents the passage of one frame of film through the optical axis 47. On the perimeters of frame pulse wheels 291 and 291a are contacts 292 and 292a which, as the frame pulse wheels rotate in a forward direction, come into contact in turn with three brushes 293, 294 and 295 on wheel 291, and 293a, 294a, and 295a on wheel 291a.

An operating current is supplied through brushes 296 and 296a to commuter rings 297 and 297a from which current passes to contacts 292 and 292a. As frame pulse wheels 291 and 291a rotate in a forward direction (indicated by the arrow on the drawing), they normally contact brushes 293 and 293a first. This causes operating current to flow to latching switches 300 and 300a which turn on, causing the triggering of reset elements 301 and 301a to turn off latching switches 302 and 302a and 303 and 303a and providing current to gates 304 and 304a.

As contacts 292 and 292a continue to rotate forward, they next contact brushes 294 and 294a which pass current onto gates 304 and 304a and 305 and 305a. Since switches 300 and 300a are also providing current to gates 304 and 304a at this time, said gates permit the passage of current to the minus one input of binary counters 225 and 225a. It will be recalled from the discussion pertaining to FIGURE 9 that forward movement of the picture medium causes a subtraction of bits from the binary counter while a reverse movement causes an addition of bits. The current passed by gates 304 and 304a causes reset elements 306 and 306a to turn off latching switches 300 and 300a whereupon gates 304 and 304a become inoperative. Thus is a single pulse to be sent from each brush 294 and 294a to their binary counters, and should the operator be performing a frame-by-frame examination and cause current to pass through brushes 294 and 294a several times in succession as he goes back and forth on a particular frame of film, only the initial pulse would be passed. The aforementioned pulse from gates 304 and 304a also causes latching switches 307 and 307a to turn on (the function of which will be explained shortly).

Gates 305 and 305a do not operate at this time because switches 302 and 302a which supply the necessary second operating current are off. The contacts 292 and 292a are so positioned on the perimeter of wheels 291 and 291a as to come into contact with brushes 294 and 294a at the instant that a frame line of the motion picture film is in the optical axis 47 of the invention.

As contacts 292 and 292a continue forward, they next come into contact with brushes 295 and 295a which cause the turning on of switches 302 and 302a and trigger reset elements 310 and 310a to turn latching switches 300 and 300a and 307 and 307a off. Also, switches 302 and 302a pass current onto gates 305 and 305a so that said gates can now pass current from brushes 294 and 294a. This completes the description of a typical forward revolution of frame pulse wheels 291 and 291a.

In the typical reverse revolution of frame pulse wheels 291 and 291a, contacts 292 and 292a first contact brushes 295 and 295a which turn on switches 302 and 302a and cause switches 300 and 300a and 307 and 307a to be turned off through the triggering of reset elements 310 and 310a. Also, the turning on of switches 302 and 302a passes current onto gates 305 and 305a which now allows said gates to pass a current which they could receive from brushes 294 and 294a.

Contacts 292 and 292a continue to rotate in a reverse direction to contact brushes 294 and 294a causing current to flow to gates 304 and 304a and 305 and 305a. Since gates 304 and 304a are not activated at the moment, no current passes through them. However, gates 305 and 305a are in an activated condition so the current from brushes 294 and 294a passes on through and causes one bit to be added into the plus one side of the binary counters 225 and 225a. Also, the aforementioned pulse causes switches 302 and 302a to be turned off through reset elements 311 and 311a, and the aforementioned pulse also turns on latching switches 303 and 303a.

Contacts 292 and 292a next in the reverse cycle contact brushes 293 and 293a which cause switches 300 and 300a to turn on and turn off, through reset elements 301 and 301a, switches 302 and 302a and 303 and 303a. This completes the description of a typical reverse revolution of frame pulse wheels 291 and 291a.

It will sometimes occur during a frame-by-frame examination of the film by the operator that as he moves the films forwards and backwards, he may not cause the frame pulse wheels 291 and 291a to turn a full revolution before he starts to view the films in the opposite direction. For example, if he were viewing the films in a forward direction, contacts 292 and 292a may have passed under brushes 293 and 293a and 294 and 294a (causing a pulse to be sent to the minus one side of the respective binary counters). However, before contacts 292 and 292a get to brushes 295 and 295a, the operator may decide to back up the film. The minus one pulse which was just entered into the binary counters must be "added out" of the binary counters if the counters are to keep an exact record of frame movement. This is accomplished in the following manner: as contacts 292 and 292a pass back under brushes 294 and 294a, nothing happens since gates 304 and 304a have already allowed their one pulse to pass (as previously explained). Then, as contacts 292 and 292a come under brushes 293 and 293a, current is sent to gates 312 and 312a and in conjunction with the current from switch 307 and 307a (previously turned on) cause a pulse to be added into the plus one side of the binary counter thus counteracting the minus one pulse just subtracted. This plus one pulse also turns off switch 307 and 307a through reset elements 313 and 313a which brings the invention back to its original condition where it is ready to account for further revolutions of frame pulse wheels 291 and 291a.

In a similar manner, if the operator had been backing up the films and contacts 292 and 292a had passed under brushes 295 and 295a and 294 and 294a (causing a plus one entry into the respective binary counters), and he then started viewing forward (before reaching brushes 293 and 293a to complete the cycle), contacts 292 and 292a cause current to be applied to brushes 294 and 294a but nothing would happen since gates 305 and 305a had already passed their one pulse. Contacts 292 and 292a would continue moving and next contact brushes 295 and 295a causing current to flow to gates 314 and 314a which along with the current from the previously turned on switches 303 and 303a cause current to pass onto the minus one sides of the binary counters 225 and 225a. This current also operates through reset elements 315 and 315a to turn off switches 303 and 303a to provide a one time pulse to the binary counters and to return the invention to its original condition.

It is to be appreciated that should the operator, in a frame-by-frame examination, cause contacts 292 and 292a to come under only the extremely located brushes 293 and 293a or 295 and 295a and then reverse viewing directions, that upon completing almost a full revolution and coming into contact with the opposite extreme brushes 295 and 295a or 293 and 293a, the turning on of switches 302 and 302a or 300 and 300a and their previously described consequential actions cause the invention to be reset, ready to account for the new direction of film travel.

The function of the elements within the dotted line 316 on FIGURE 9 remain the same for the embodiment presently under discussion. However, the following should be kept in mind. The current which flows from gate 275a when binary counter 225 is at frame 17 is the equivalent of that current which flows from brush 157 into switch 110, while the current that flows from gate 262 at the instant that the splice simulation is to take place is the equivalent of that from brush 156 which also enters switch 110. All wiring to the "F" (simulate splice) and "G" (stop) positions of switch 111 is replaced by an additional gang to switch 111 which has the corresponding elements of switch 226 for its first and second positions. The reverse capstan drives 244 and 244a of FIGURE 9 rotate drive motors 51 and 51a of FIGURE 5 in a reverse direction while forward pulsers 251 and 251a cause drive motors 51 and 51a to rotate forward one revolution at a time a few times per second. The locking unit 256 in FIGURE 9 is equivalent to the solenoid 137 which locks shafts 52 and 52a together in FIGURE 5 when the films are ready to begin their splice simulation run. The forward capstan drive 255, in the embodiment referred to in FIGURE 10, supplies power to cause both drive motors 51 and 51a to rotate in a forward direction. The function of relays 134, 136 and 142 have been replaced by circuitry within dotted line 316 and therefore are eliminated.

It can readily be seen that if one desires to use the circuitry of FIGURE 10 with that of FIGURE 9 to control television tape recorders, the three brushes 293 and 293a, 294 and 294a, and 295 and 295a can be applied to magnetic pickup heads located adjacent to each other along the aforementioned control tracks of tapes 221 and 221a. Here they pick up the frame pulses recorded on the control tracks and deliver them to the circuitry of FIGURE 10 and thence onto the circuitry of FIGURE 9 for functioning as previously described.

The foregoing detailed description has been given for clearness of understanding only, and no unnecessary limitations should be understood therefrom, for modifications will be obvious to those skilled in the art. Whereas solid state electronic elements have been described, it is to be appreciated that tubes, relays, and hydraulic or pneumatic equivalents may be utilized. In a like manner, where circuits have been shown carried by discs, it is to be understood that the number of discs may be increased and that other types of endless members may be substituted.

Having thus described my invention, what I claim as new and desire to secure by Letters Patent of the United States is:

1. Apparatus for simulating a splice of a pair of film strips which comprises visual receiving means, a pair of image-projecting means conveying images to said visual receiving means, driving means adapted to advance and back up selectively and independently said two film strips and to advance them simultaneously during the splice simulation run, switch means for shifting the image conveyed to said visual receiving means from one of said projecting means to the other, responsive means associated with said films and said switch means for shifting said images conveyed to said visual receiving means at a preselected place on one of said film strips and at a separately preselected place on the other of said film strips from one of said projecting means to the other, and identifying means for selectively indicating the places on said films wherein said images to said visual receiving means are shifted from one of said film strips to the other for future splicing.

2. Apparatus in accordance with claim 1, wherein said film strip comprises television tape.

3. Apparatus in accordance with claim 1, wherein said film strip comprises motion picture film.

4. Apparatus for shifting signals emitted from one intelligence carrier to signals emitted from a second intelligence carrier at a point predetermined with reference to each of said carriers, which comprises a first intelligence carrier, a first intelligence communication means adapted to communicate information from said first intelligence carrier, first motive means, said first intelligence carrier means movable selectively in both a first direction and a direction reverse thereto by said motive means relative to said first intelligence communication means, a first measuring device, a first synchronization control selectively interconnecting said first measuring device and said first motive means, a first quantitative reverse selection means associated with said first measuring device for reversing said first intelligence carrier means a predetermined amount, a second intelligence carrier, a second intelligence communication means adapted to communicate information from said second intelligence carrier, second motive means, said second intelligence carrier means movable selectively in a first direction and a direction reverse thereto by said motive means relative to said second intelligence communication means, a second measuring device, a second synchronization control selectively interconnecting said second measuring device and said second motive means, a second quantitative reverse selection means associated with said second measuring device for reversing said second intelligence carrier a predetermined amount, intelligence receiving means adapted to receive intelligence from said communications means, shifting means associated with said measuring devices, adapted to shift the communication of intelligence from one of said carriers to the other of said carriers when the quantity measured by each said measuring device is a predetermined amount.

5. Apparatus in accordance with claim 4 wherein said carriers comprise television tapes.

6. Apparatus in accordance with claim 5 wherein said measuring devices comprise binary counters.

7. Apparatus in accordance with claim 4 wherein said carriers comprise motion picture film.

8. Apparatus in accordance with claim 7 wherein said measuring devices comprise binary counters.

9. Apparatus in accordance with claim 7 wherein said measuring devices comprise endless members.

10. Apparatus in accordance with claim 9 wherein said endless members are discs.

11. Apparatus for simulating a splice on film strips which comprises image-receiving means, first and second image-producing means for selectively producing visual images on said image-receiving means, first and second film strips respectively received by said first and second image-producing means, said first and second image-producing means each including motive means for moving said strips, said first and second image-producing means each including image communication means between the corresponding film strips and said image-receiving means, first and second synchronizing means respectively associated with said first image producing means, said first and second selection means selectively synchronizing said synchronizing means with the motion of the respective strips when the corresponding selection means is actuated, motion control means associated with each of said selection means whereby each said strip may be backed up independently through their respective image-producing means from the points of actuation of said selection means an equal distance, switching means associated with both of said image communication means and both said selection means whereby when said film strips are moved forward together with said switch means said switching means switches the image on said image-producing means from an image from said first film strip to an image from said second film strip.

12. Apparatus in accordance with claim 11, wherein said film strip comprises television tape.

13. Apparatus in accordance with claim 11, wherein said film strip comprises moving picture film.

14. Apparatus in accordance with claim 11, wherein locking means is provided for selectively locking together the motion of said film strips after same have been backed up an equal distance from the points of actuation of said selection means.

15. A method for simulating a splice on film which comprises advancing and visually inspecting a first strip of film to a first place, advancing and visually inspecting a second strip of film to a second place, backing up both of said film strips the same predetermined number of frames, and advancing both strips of film while projecting and visually inspecting said first strip of film on said visual receiving means for said predetermined number of frames and thereafter projecting and visually inspecting said second strip of film on said visual receiving means.

16. A method of shifting signals emitted from one continuously moving intelligence carrier to signals emitted from a second continuously moving intelligence carrier at a predetermined point which comprises separately receiving said signals emitted from each of said carriers, synchronizing a pair of measuring instruments with each of said carriers at the desired shift point on each of said carriers, reversing each of said carriers in equal quantity as measured by said measuring instruments, synchronizing said measuring instruments with each other, running said carrier forward and receiving said signals from one of said carriers until said measuring instruments reach the point they were synchronized with respect to their respective carriers, and at said point shifting the receipt of signals from the other of said carriers.

References Cited
UNITED STATES PATENTS

| | | | |
|---|---|---|---|
| 2,927,154 | 3/1960 | Wolfe | 178—6.6 |
| 3,230,307 | 1/1966 | Bounsall | 178—6.6 |

ROBERT L. GRIFFIN, *Primary Examiner.*

JOHN W. CALDWELL, *Examiner.*

H. W. BRITTON, *Assistant Examiner.*